(12) United States Patent
Stockner et al.

(10) Patent No.: US 10,821,841 B2
(45) Date of Patent: Nov. 3, 2020

(54) TRACKED VEHICLE, POWER SUPPLY APPARATUS FOR POWERING THE TRACKED VEHICLE AND HANDLING SYSTEM IN A WORK AREA COMPRISING THE TRACKED VEHICLE AND POWER SUPPLY APPARATUS

(71) Applicant: WINDFIN B.V., Leimuiden (NL)

(72) Inventors: Günther Stockner, Leimuiden (NL); Georg Folie, Leimuiden (NL)

(73) Assignee: WINDFIN B.V., Leimuiden (NL)

( * ) Notice: Subject to any disclaimer, the term of this patent is extended or adjusted under 35 U.S.C. 154(b) by 231 days.

(21) Appl. No.: 15/573,001

(22) PCT Filed: May 13, 2016

(86) PCT No.: PCT/IB2016/052784
§ 371 (c)(1),
(2) Date: Nov. 9, 2017

(87) PCT Pub. No.: WO2016/185346
PCT Pub. Date: Nov. 24, 2016

(65) Prior Publication Data
US 2018/0118039 A1    May 3, 2018

(30) Foreign Application Priority Data
May 15, 2015    (IT) .............................. MI2015A0686

(51) Int. Cl.
*B60L 50/53*    (2019.01)
*B60L 5/04*    (2006.01)
(Continued)

(52) U.S. Cl.
CPC ................. *B60L 50/53* (2019.02); *B60L 3/04* (2013.01); *B60L 5/04* (2013.01); *B60L 5/06* (2013.01);
(Continued)

(58) Field of Classification Search
CPC ...... B60L 9/00; B60L 9/02; B60L 9/04; B60L 9/08; B60L 9/14; H02G 11/00; H02G 11/02
See application file for complete search history.

(56) References Cited

U.S. PATENT DOCUMENTS

| 1,817,093 A | 8/1931 | Morgan |
| 4,108,264 A | 8/1978 | Tanaka |

(Continued)

FOREIGN PATENT DOCUMENTS

| CN | 102807135 | 12/2012 |
| GB | 2512315 | 10/2014 |
| WO | WO 2010/103117 | 9/2010 |

OTHER PUBLICATIONS

Notification Concerning Submission, Obtention or Transmittal of Priority Document for International Application No. PCT/IB2016/052784 dated Sep. 5, 2016.

(Continued)

*Primary Examiner* — Robert J McCarry, Jr.
(74) *Attorney, Agent, or Firm* — Neal, Gerber & Eisenberg LLP

(57) ABSTRACT

A tracked vehicle comprising an electric machine assembly, a first and a second track coupled to the electric machine assembly, and an electric connection device, connectable to a power supply apparatus outside the tracked vehicle and connected to the electric machine assembly to exchange electrical energy with the power supply apparatus during the operation of the tracked vehicle.

21 Claims, 3 Drawing Sheets

(51) Int. Cl.
    *B60L 9/00*     (2019.01)
    *B60L 5/06*     (2006.01)
    *B60L 11/18*     (2006.01)
    *B60L 3/04*     (2006.01)
    *B60L 5/19*     (2006.01)
    *B60M 1/12*     (2006.01)
    *B60M 7/00*     (2006.01)
    *B62D 55/00*     (2006.01)

(52) U.S. Cl.
    CPC ............... *B60L 5/19* (2013.01); *B60L 9/00* (2013.01); *B60L 11/1801* (2013.01); *B60M 1/12* (2013.01); *B60M 7/00* (2013.01); *B62D 55/00* (2013.01); *B60L 2200/40* (2013.01); *Y02T 10/7005* (2013.01)

(56) References Cited

U.S. PATENT DOCUMENTS

| | | | |
|---|---|---|---|
| 4,587,383 A * | 5/1986 | Stoldt | B60M 7/00 |
| | | | 191/12 R |
| 6,191,502 B1 | 2/2001 | Grossenbacher et al. | |
| 2010/0006385 A1* | 1/2010 | Aubigny | B60L 3/00 |
| | | | 191/2 |
| 2013/0192944 A1 | 8/2013 | Zimmerman et al. | |
| 2014/0032006 A1 | 1/2014 | Tojima et al. | |
| 2014/0041951 A1 | 2/2014 | Tojima et al. | |

OTHER PUBLICATIONS

Notification of Transmittal of the International Search Report and the Written Opinion for International Application No. PCT/IB2016/052784 dated Sep. 13, 2016.

European Office Action for Application No. 16 733 688.2 dated Aug. 27, 2020 (6 pages).

* cited by examiner

TRACKED VEHICLE, POWER SUPPLY APPARATUS FOR POWERING THE TRACKED VEHICLE AND HANDLING SYSTEM IN A WORK AREA COMPRISING THE TRACKED VEHICLE AND POWER SUPPLY APPARATUS

PRIORITY CLAIM

This application is a national stage application of PCT/IB2016/052784, filed on May 13, 2016, which claims the benefit of and priority to Italian Patent Application No. MI2015A000686, filed on May 15, 2015, the entire contents of which are each incorporated by reference herein.

TECHNICAL FIELD

The present disclosure relates to a tracked vehicle, a power supply apparatus configured to power the tracked vehicle and a handling system in a work area comprising the tracked vehicle and the power supply apparatus of the tracked vehicle.

BACKGROUND

One known type of tracked vehicle disclosed in PCT Patent Application WO 2010/103117 has a first and a second track, an internal combustion engine, a set of working devices and an electric power transmission that connects the internal combustion engine to the first and second tracks.

One drawback of certain known tracked vehicles is that the tracked vehicle is noisy. Another known drawback is that the tracked vehicle has emissions that pollute the environment in which the tracked vehicle is working. Another known drawback is that the internal combustion engine of the tracked vehicle needs relatively expensive routine maintenance. Yet another known drawback is that the tracked vehicle has a relatively high cost.

SUMMARY

One advantage of the present disclosure is to provide a tracked vehicle that overcomes at least one of the drawbacks of certain known tracked vehicles.

According to the present disclosure, a tracked vehicle is provided that comprises an electric machine assembly, at least one track coupled to the electric machine assembly, and an electric connection device, connectable to a power supply apparatus outside the tracked vehicle and connected to the electric machine assembly, to exchange electrical energy with the power supply apparatus during operation of the tracked vehicle.

Thanks to the electric connection device, the tracked vehicle exchanges electrical energy with the outside during operation and, in this way, reduces both noise and atmospheric pollution in the place where used.

Another advantage of the present disclosure is to provide a power supply apparatus to power a tracked vehicle inside a work area and which reduces at least one drawback of the known art.

According to the present disclosure, a power supply apparatus is provided for supplying power to a tracked vehicle inside a work area, wherein the apparatus comprises a supply system configured to be connected to the tracked vehicle disclosed herein.

Another advantage of the present disclosure is to provide a handling system inside a work area that reduces at least one of the drawbacks of known tracked vehicles.

According to the present disclosure, a handling system is provided inside a work area comprising a tracked vehicle as disclosed herein and a power supply apparatus as disclosed herein.

Additional features and advantages are described in, and will be apparent from the following Detailed Description and the figures.

BRIEF DESCRIPTION OF THE DRAWINGS

Other characteristics and advantages of the present disclosure will become clear from the following description of a non-limitative embodiment, with reference to the accompanying drawings, in which.

DETAILED DESCRIPTION

Figure 1:
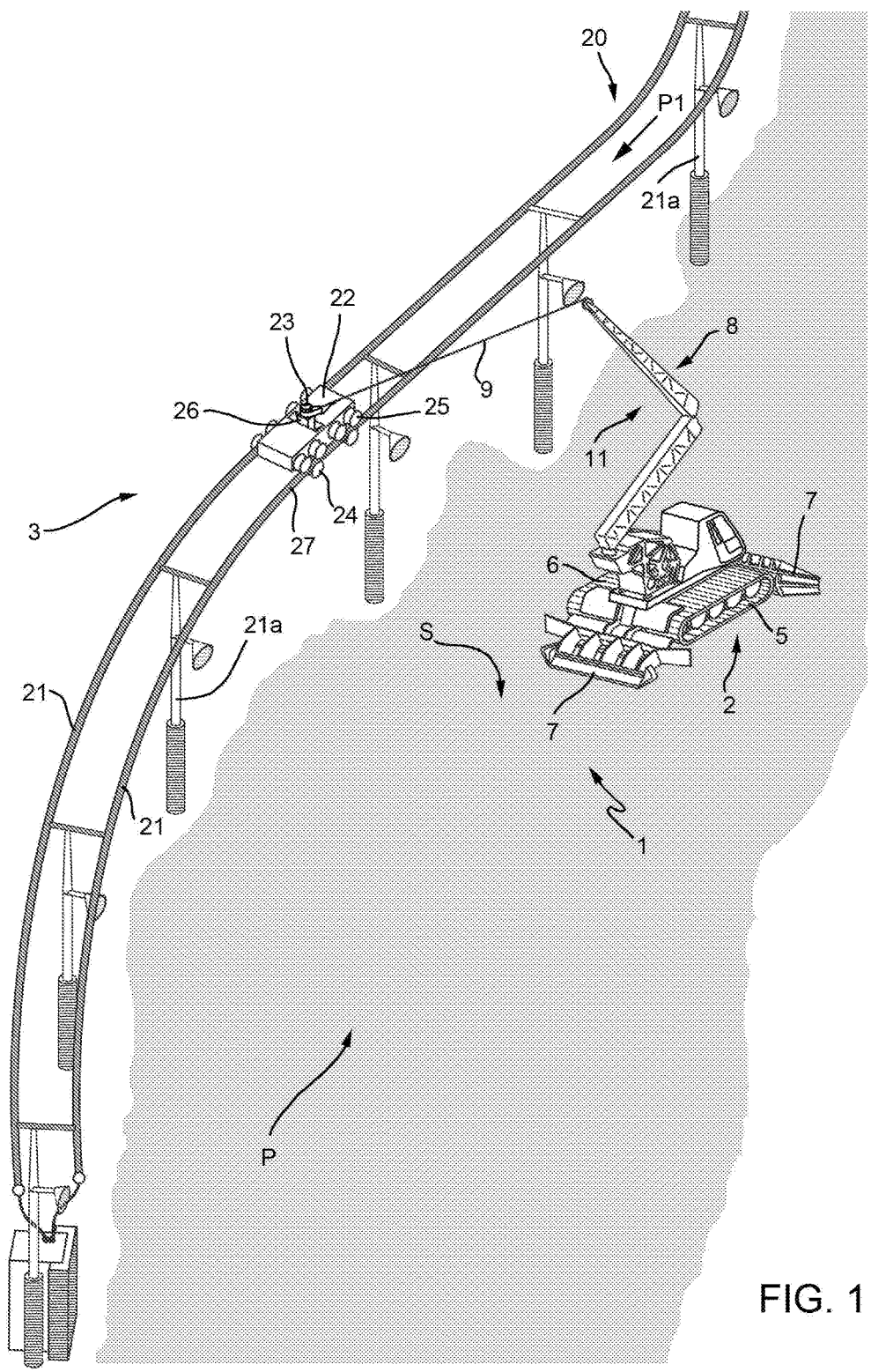
FIG. 1 is a perspective view of a handling system inside a work area comprising a tracked vehicle and a power supply apparatus for the tracked vehicle made in accordance with the present disclosure.

Referring now to the example embodiments of the present disclosure illustrated in FIGS. 1 to 4, and specifically referring to FIG. 1, reference numeral 1 defines, as a whole, a handling system inside a work area P comprising a tracked vehicle 2, a power supply apparatus 3 configured to power the tracked vehicle 2 and a control unit 16. In a non-limitative embodiment of the present disclosure, the work area P is on soft ground or loose soil. By way of a non-limitative example of the present disclosure, the tracked vehicle 2 shown in the accompanying drawings is a snow groomer and the work area P is a ski run, in particular a cross-country ski run or a downhill ski run. Furthermore, the work area P can be a covered or an open work area.

In one embodiment, the control unit 16 is housed in the tracked vehicle 2. In another embodiment, the control unit 16 is housed in the power supply apparatus 3. In yet another embodiment, the control unit 16 is housed externally to the tracked vehicle 2 and to the power supply apparatus 3.

Figure 2:
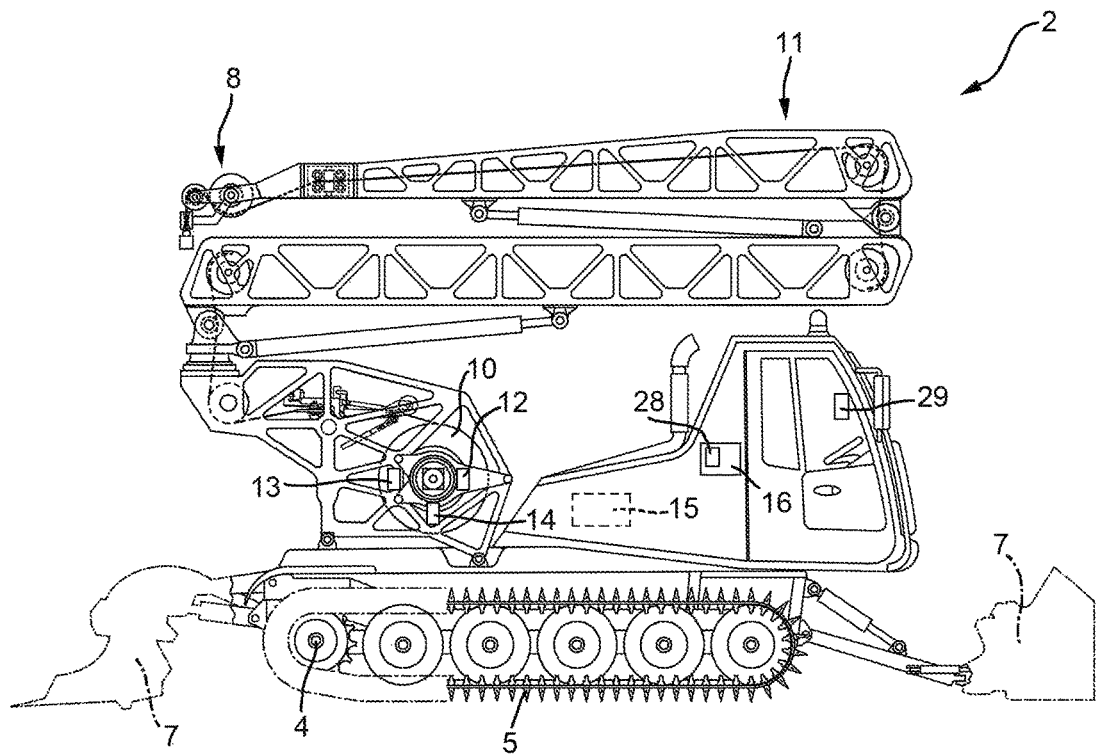
FIG. 2 is a side view, with parts removed for clarity, of the tracked vehicle in FIG. 1.
Figure 4:
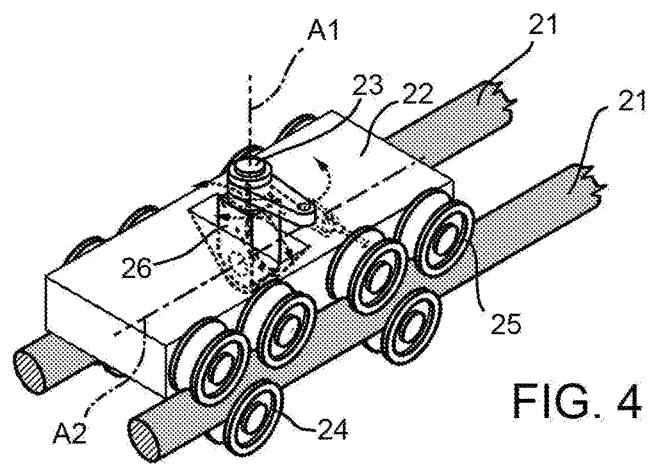
FIG. 4 is an enlarged view of a detail in FIG. 1.
Figure 3:
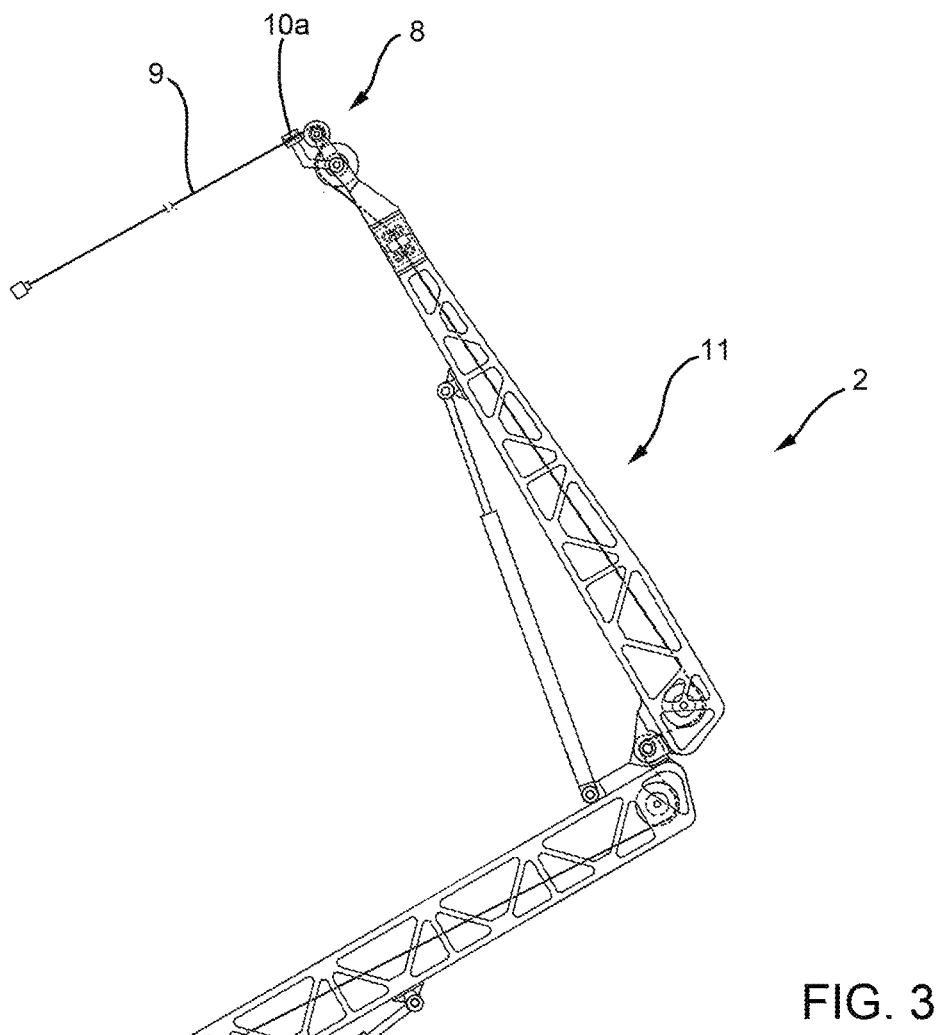
FIG. 3 is a side view, with parts removed for clarity, of the tracked vehicle in FIG. 1 in a different operating configuration with respect to FIG. 2.

Referring to FIGS. 2 and 3, the tracked vehicle 2 comprises: an electric machine assembly 4; two tracks 5 and 6 (FIG. 1) coupled to the electric machine assembly 4; a plurality of working devices 7 connected to the electric machine assembly 4; and an electric connection device 8 connected to the power supply apparatus 3 of the tracked vehicle 2 and connected to the electric machine assembly 4 to exchange electrical energy with the power supply apparatus 3 of the tracked vehicle 2 during operation of the tracked vehicle 2. In other words, the tracked vehicle 2 moves inside the work area P and is simultaneously powered by electrical energy taken from the power supply apparatus 3.

In an alternative embodiment (not shown in the accompanying drawings), the tracked vehicle comprises only one track.

The electric machine assembly 4 comprises at least one electric machine and at least one converter that receives electrical energy from the electric connection device 8 and supplies the electrical energy to the at least one electric machine. In greater detail, the electric machine is indirectly connected by a wheel and/or a mechanical transmission unit (not shown in the accompanying drawings).

In one embodiment, the electric machine 4 is a direct current electric machine. In another embodiment, the electric machine 4 is a synchronous or asynchronous alternating current electric machine. In an alternative embodiment of the present disclosure (not shown in the accompanying drawings), the tracked vehicle comprises an electric machine that supplies kinetic energy to a hydraulic pump, which in turn supplies power to a hydraulic motor.

In certain embodiments of the present disclosure, the electric machine assembly 4 comprises two electric machines, each coupled to a respective track 5 and 6.

In addition, the electric machine assembly 4 is reversible, in other words, the electric machine assembly can function both as an electric motor and as an electric generator. When electric machine assembly 4 functions as an electric motor, electric machine assembly takes electrical energy from the electric connection device 8 and supplies kinetic energy to the tracks 5 and 6. When the electric machine assembly 4 functions as an electric generator, electric machine assembly receives kinetic energy from the tracks 5 and 6, for example to brake the motion of the tracked vehicle 2, and supplies electrical energy to the electric connection device 8, which in turn feeds electrical energy to the power supply apparatus 3.

The electric connection device 8 comprises an electric cable 9 connectable to the power supply apparatus 3 of the tracked vehicle 2 and partially wound around a winch 10. The length of the electric cable 9 is greater than 25 meters (and in certain embodiments greater than 50 meters) to ensure operation of the tracked vehicle 2 while electric cable is connected to the power supply apparatus 3 and to ensure that the tracked vehicle 2 can move between the lateral limits of the work area P. The electric cable 9 comprises two conductor cores separated from one another to carry the phase and earth of the electric current, or the positive pole and the negative pole. In an alternative embodiment of the present disclosure, the electric cable 9 comprises three conductor cores separated from one another to carry a three-phase current.

In an alternative embodiment of the present disclosure, the electric cable 9 comprises only one conductor core, which carries the phase of the electric current. In said embodiment, the earth for the electric current is connected to the ground S in various points and the tracked vehicle 2 is connected to the earth of the tracked vehicle 2 running to the ground S.

Furthermore, the electric connection device 8 comprises the winch 10 configured to wind part of the electric cable 9 and an arm 11 to lift the electric cable 9 to a designated or given height off the ground. In particular, the arm 11 comprises two folding elements 11a and 11b in order to vary the distance from the ground S. In an alternative embodiment of the present disclosure (not shown in the accompanying drawings), the arm 11 is a telescopic arm configured to extend or retract in order to vary the distance from the ground S.

In addition, the electric connection device 8 comprises a tensioning unit 12 for the electric cable 9 that acts on the winch 10, comprises a mechanical tension meter 10a for the electric cable 9 and is coupled to the winch 10 to keep the mechanical tension of the electric cable 9 within a designated or given operating range. In other words, the winch 10 is controlled by the tensioning unit 12 so that the electric cable 9 has a mechanical tension within the designated or given operating range of mechanical tension. Thanks to the tensioning unit 12, the electric connection device 8 ensures that the electric cable 9 does not touch the ground S. Furthermore, thanks to the tensioning unit 12, the electric connection device 8 ensures that the electric cable 9 does not break or become disconnected from the power supply apparatus 3. In addition, the electric connection device 8 comprises a shutdown switch 13 that is operated when the electric cable 9 has a mechanical tension different from the values in an operating range of mechanical tension. Furthermore, in the case where the electric voltage is different from the values in an operating range of electric voltage, the shutdown switch 13 operates to disconnect the electric cable 9.

In addition, the electric connection device 8 comprises a measuring device 14 that enables measuring the length of the unwound electric cable 9. For example, the measuring device 14 is an encoder coupled to the winch 10 that measures the number or quantity of turns and direction of rotation of the winch 10. Thanks to the measuring device 14, it is possible to derive a measurement of the distance of the tracked vehicle 2 from the power supply apparatus 3.

The electric connection device 8 is connected to the control unit 16 to transmit and receive data. The electric connection device 8 sends the measurement of the length of unwound electric cable 9 to the control unit 16.

In an alternative embodiment of the present disclosure, the tracked vehicle 1 comprises a battery 15 (shown with broken lines in FIGS. 2 and 3) configured to enable the tracked vehicle 1 to have a short period of autonomy in the event of maneuvers in a depot or to move from one power supply apparatus 3 to another power supply apparatus.

Referring to FIG. 1, the power supply apparatus 3 of the tracked vehicle 2 comprises a supply system 20 configured to be connected to the tracked vehicle 2, and a slider 22 connected to the supply system 20 and movable along the supply system 20.

In greater detail, the supply system 20 extends along a path P1 and comprises two conductive elements 21 to carry the phase and earth of the electric current and supports 21a that support the two conductive elements 21 at a given or designated height off the ground S, such as a height of greater than 2.5 meters.

In an alternative embodiment of the present disclosure (not shown in the accompanying drawings), the supply system 20 comprises three conductive elements 21 configured to carry a three-phase current.

In certain embodiments of the present disclosure, the path P1 extends laterally to the ski run P.

In an alternative version of the present disclosure (not shown in the accompanying drawings), the conductive elements 21 are supported by the supports of a ski lift or a lighting system.

In an alternative embodiment (not shown in the accompanying drawings), one of the two conductive elements 21, in particular the conductive element 21 that carries the phase of the electric current, is supported by the supports 21a and fastened at a designated or given height off the ground, and the other conductive element 21, which carries the earth, is connected to the ground S.

In the illustrated embodiment, shown in FIG. 1, the conductive elements 21 comprise two cables of an electrically conductive material capable of supporting the slider 22. In another embodiment, the conductive elements 21 are rails made of an electrically conductive material and are capable of supporting the slider 22.

In one embodiment of the present disclosure, the conductive elements 21 are made of a luminous material so as to visible in the dark or in poor light conditions. In another embodiment, the conductive elements 21 are coated with a fluorescent material. In yet another embodiment, the conductive elements 21 comprise LEDs. Thanks to the luminous conductive elements 21, it is possible to see the conductive element 21 in any lighting condition, thus facilitating coupling with the tracked vehicle 1 and reducing hazardous situations due to accidental contact with the conductive element 21.

Referring to FIG. 1, the slider 22 is defined by a trolley 22 coupled to the supply system 20 and configured to move along the path P1. The trolley 22 comprises a connector 23 rotating about an axis A1 perpendicular to the conductive elements 21 and passing through the ground S. Furthermore, the connector 23 is configured to be connected to the electric connection device 8 of the tracked vehicle 2 and to enable rotation of the electric connection device 8 about axis A1.

In certain embodiments, the connector 23 is configured to rotate 360° about axis A1.

In addition, the connector 23 is configured to rotate about an axis parallel to the conductive elements 21 to enable an upward or downward movement of the electric cable 9, such as perpendicularly to the ground S.

The connector 23 comprises an angular measuring device 26 to measure the angular movement of the connector 23 about axis A1 and about axis A2.

The slider 22 is supported by the conductive elements 21 and is free to move along the conductive elements 21. In particular, the slider 22 is drawn along the conductive elements 21 by the electric cable 9.

In an alternative embodiment of the present disclosure, the slider 22 comprises an active actuating device 24 configured to move the slider 22 along the conductive elements 21. In particular, the active actuating device 24 is configured to move the slider 22 along the conductive elements 21 to follow the electric connection device 8 of the tracked vehicle 2. The active actuating device 24 comprises a motor.

The power supply apparatus 3 comprises a position detector 27 configured to detect the position of the slider 22 along the path P1. The power supply apparatus 3 is connected to the control unit 16 to transmit and receive data. The power supply apparatus 3 sends the position of the slider to the control unit 16.

The slider 22 is connected to the control unit 16 to transmit and receive data. The slider 22 sends data regarding measurement of the rotation about axis A1 and about axis A2 of the connector 23 to the control unit 16.

The slider 22 comprises a sliding contact 25, coupled to the conductive elements 21, to transmit electrical power. In an alternative embodiment of the present disclosure, the conductive elements 21 are configured to transmit electrical power and electrical signals.

The control unit 16 processes the data regarding the position of the slider 22 along the path P1, the angular movement of the connector 23 about axis A1 and about axis A2 and the measurement of the length of unwound cable 9 and determines the position of the tracked vehicle 1 inside the work area P. In the case where the work area P is covered in snow, the control unit 16 comprises a storage unit 28 in which the work area P is memorized. The control unit 16 determines the height of the tracked vehicle 1 and, based on the memorized work area P, computes the amount of snow beneath the tracked vehicle 1.

On the basis of the received data, the control unit 16 determines an optimal path for the tracked vehicle 2 to optimize consumption and to improve the work that the tracked vehicle 1 must carry out inside the work area P. The control unit 16 sends the data regarding the optimal path to the tracked vehicle 2. The tracked vehicle 2 comprises a graphical interface 29 that shows an operator the optimal path to follow inside the work area P.

In one embodiment, the electricity supply system 20 is supplied with direct current. The tracked vehicle 2 comprises a direct current electric machine and a voltage regulator to vary the speed and/or torque of the direct current electric machine. In an alternative embodiment, the tracked vehicle 2 comprises an alternating current electric machine and a converter that is connected to the electric machine and is configured to convert direct current into alternating current and vice versa.

In another embodiment of the present disclosure, the electricity supply system 20 is supplied with alternating current. The tracked vehicle 2 comprises a direct current electric machine and a converter connected to the electric machine and configured to convert alternating current into direct current and vice versa. In an alternative embodiment, the tracked vehicle 2 comprises an alternating current electric machine and two converters connected to the electric machine and configured to control the alternating current of the electricity supply system 20 and the alternating current of the electric machine.

In an alternative embodiment of the present disclosure (not show in the drawings), the power supply apparatus does not comprise the sliding contact and the electric connection device comprises a sliding contact that couples to the conductor system of the power supply apparatus, for example a pantograph that couples to the conductor system of the power supply apparatus.

Furthermore, it is evident that the present disclosure also covers embodiments not described in the detailed description and equivalent embodiments that fall within scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A snow groomer comprising:
   an electric machine assembly;
   at least one track coupled to the electric machine assembly;
   a snow grooming working device connected to the electric machine assembly; and
   an electric connection device releasably connectable to a moveable power supply apparatus outside the snow groomer, said electric connection device connected to the electric machine assembly to exchange electrical energy with the power supply apparatus during operation, and the electric connection device comprising a shutdown switch configured to disconnect an electric cable responsive to the electric cable having a mechanical tension that is outside an operating range of mechanical tensions.

2. The snow groomer of claim 1, wherein the electric connection device comprises the electric cable releasably connectable to the power supply apparatus.

3. The snow groomer of claim 1, wherein the electric connection device comprises:
a winch configured to wind the electric cable, and
an arm configured to keep the electric cable at a designated height off a ground surface.

4. The snow groomer of claim 3, wherein the electric connection device comprises an electric cable tensioning unit coupled to and acting on the winch to keep the mechanical tension of the electric cable within the operating range of mechanical tensions.

5. The snow groomer of claim 1, wherein the electric connection device comprises a measuring device that enables a length of unwound electric cable to be measured.

6. The snow groomer of claim 1, further comprising a battery connected to the electric machine assembly.

7. The snow groomer of claim 1, wherein the electric connection device comprises a sliding contact connectable to the power supply apparatus.

8. A power supply apparatus configured to power a snow groomer inside a work area, the power supply apparatus comprising:
a supply system configured to be releasably connected to the snow groomer which includes an electric machine assembly, at least one track coupled to the electric machine assembly, and an electric connection device connected to the electric machine assembly and configured to exchange, via an electric cable, electrical energy with the supply system during operation of the snow groomer;
at least one conductive element which extends along a path; and
a slider supported by the at least one conductive element and coupled to the at least one conductive element to move along the path.

9. The power supply apparatus of claim 8, wherein the at least one conductive elements comprises two conductive elements which extend along the path, and at least a first conductive element of the two conductive elements is located at a height of at least 2.5 meters off a ground surface.

10. The power supply apparatus of claim 9, wherein at least the first conductive element is selected from the group consisting of: a cable and a rail.

11. The power supply apparatus of claim 8, further comprising a position detector configured to detect a position of the slider along the path.

12. The power supply apparatus of claim 8, wherein the slider comprises a connector rotatable about an axis perpendicular to the at least one conductive element and passing through the ground surface, said slider being configured to be connected to the electric connection device of the snow groomer to enable the electric connection device to rotate about the axis.

13. The power supply apparatus of claim 12, wherein the slider comprises an angular measuring device configured to detect an angular movement of the connector.

14. The power supply apparatus of claim 8, wherein the connector is configured to rotate about an axis parallel to the at least one conductive element to enable an upward or downward movement of the electric cable.

15. The power supply apparatus of claim 14, wherein the movement of the electric cable is perpendicular to the ground surface.

16. The power supply apparatus of claim 8, wherein the slider is configured to be drawn by the electric cable along the at least one conductive element.

17. The power supply apparatus of claim 8, wherein the slider comprises an actuating device configured to move the slider along the at least one conductive element to follow the electric connection device of the snow groomer.

18. The power supply apparatus of claim 17, wherein the actuating device comprises a motor.

19. The power supply apparatus of claim 8, wherein the slider comprises a sliding contact coupled to the at least one conductive element and configured to transmit electrical power and electrical signals.

20. A snow groomer handling system within a work area, the snow groomer handling system comprising:
a snow groomer including an electric machine assembly, at least one track coupled to the electric machine assembly, a snow grooming working device connected to the electric machine assembly, and an electric connection device connected to the electric machine assembly, the electric connection device including a shutdown switch configured to disconnect an electric cable responsive to the electric cable having a mechanical tension that is outside an operating range of mechanical tensions; and
a power supply apparatus configured to power the snow groomer inside a work area, the power supply apparatus comprising a moveable supply system comprising at least one conductive element which extends along a path and supports a slider configured to move along the path, the moveable supply system configured to be releasably connected to the electric connection device of the snow groomer to exchange, via the electric cable, electrical energy during operation of the snow groomer.

21. The snow groomer handling system of claim 20, further comprising a control unit configured to:
receive data from the snow groomer,
receive data from the power supply apparatus, and
send data to the snow groomer.

* * * * *